United States Patent [19]

Devonald et al.

[11] Patent Number: 5,290,630
[45] Date of Patent: Mar. 1, 1994

[54] CHROMOPHORE-CONTAINING COMPOUNDS FOR OPTO-ELECTRONIC APPLICATIONS

[75] Inventors: David P. Devonald, Oldham; Ian Ferguson, Walsden; Michael G. Hutchings, Holcombe; Timothy G. Ryan, Great Ayton, all of England

[73] Assignee: Imperial Chemical Industries plc, London, United Kingdom

[21] Appl. No.: 754,014

[22] Filed: Sep. 3, 1991

[30] Foreign Application Priority Data

Sep. 5, 1990 [GB] United Kingdom ............... 9019347

[51] Int. Cl.$^5$ ............................................. G02F 1/35
[52] U.S. Cl. ................................... 428/333; 428/522; 428/704; 359/328; 385/141
[58] Field of Search ............ 428/195, 522, 412, 473.5, 428/446, 447, 480, 492, 500; 526/200, 202, 201, 204, 218.1, 287, 288; 359/328, 257; 385/141

[56] References Cited

U.S. PATENT DOCUMENTS

| | | | |
|---|---|---|---|
| 3,988,312 | 10/1976 | Roueche | 428/446 |
| 4,315,848 | 2/1982 | Dexter et al. | 524/100 |
| 4,886,339 | 12/1989 | Scozzafava et al. | 385/141 |
| 4,935,292 | 6/1990 | Marks et al. | 428/220 |
| 5,026,147 | 6/1991 | Soane et al. | 359/328 |
| 5,034,277 | 7/1991 | Laschewsky et al. | 385/122 |
| 5,112,881 | 5/1992 | Mandal et al. | 430/281 |
| 5,155,195 | 10/1992 | Feuer | 526/243 |

Primary Examiner—Patrick J. Ryan
Assistant Examiner—William A. Krynski
Attorney, Agent, or Firm—Cushman, Darby & Cushman

[57] ABSTRACT

The use of a multi-functional, chromophore containing, polymerizable compound for producing an optical element having non-linear optical properties (an NLO element) wherein the multi-functional chromophore is a compound capable of being polymerized into a cross-linked network and of being poled under the influence of an electric field whilst being polymerized into the cross-linked network, the compound having the generalized formula (D) (C) (A) (F)

D, C, A and F representing covalently linked moieties where C represents at least one conjugated system of $\pi$-bonds, A and D represent at least one respectively $\pi$-electron acceptor and $\pi$-electron donor groups linked at opposite ends of the conjugated system, and are preferably conjugated with the conjugated system of $\pi$-bonds (C) and where more than one moiety A, C or D is present they may be the same or different, F represents at least two polymerizable functional groups, which may be the same or different, attached to the $\pi$-conjugated system C or the groups A and D via substituent groups $R_1$, and $R_2$, where $R_1$ and $R_2$ are selected from alkyl, cycloalkyl, aryl heteroalkyl, alkenyl, cycloalkenyl, and alkynyl including groups which have been substituted or contain heteroatom replacement, the groups F being linked to the compound so that after the compound has been polymerized to give a cross-linked network the interpolymerized functional groups prevent significant realignment of the chromophore groups when the optical element is subject to temperature changes during any further fabrication and in use.

10 Claims, No Drawings

CHROMOPHORE-CONTAINING COMPOUNDS FOR OPTO-ELECTRONIC APPLICATIONS

The present invention relates to chromophore containing compounds from which materials with non-linear optical properties (hereinafter termed NLO properties) can be formed, and to the conversion of these compounds into intermediate products useful in the production of NLO devices.

The materials derived from compounds of the present invention are suitable for applications that exploit second order non-linear optical properties, particularly the linear electro-optic effect. For maximum performance the NLO material should exhibit the largest possible change in refractive index when an external electric field is applied. In the case of an applied electric AC or DC field this is characterised by an electro-optic coefficient, ($r_c$). The size of the change is related to the first molecular hyperpolarisability, $\beta$, of the chromophore through both the size of $\beta$ and the degree of molecular ordering. The size of the molecular hyperpolarisability is determined by the structure of the molecule, but materials having large values of $\beta$ are ineffective if the structure of the material is symmetric rendering it non-polar.

Materials currently commercially exploited in devices because of their NLO properties include potassium dihydrogen phosphate (KDP), lithium niobate (LiNbO$_3$) and Group III/V semi conductor materials such as GaAs.

Certain organic materials have large values of $\beta$ and various methods have been found for incorporating organic molecules into non-centrosymmetric structures. These methods include crystal growth techniques, multilayer Langmuir-Blodgett film deposition and the use of strong electric DC fields to pole NLO active chromophores grafted to a polymer backbone. Organic materials can also be dissolved and poled in a polymeric host material or can be functionalised with chemical groups that enable the material to be incorporated into a cross-linked network. Whilst each approach has both advantages and disadvantages they tend to have limited versatility for the production of devices. To date the combined disadvantages of existing organic materials have outweighed the combined advantages of inorganic materials.

A versatile materials approach has now been devised that overcomes the disadvantages of the previously used organic materials and offers superior performance over the aforementioned inorganic materials and provides compounds, formulations and products suitable for use in the manufacture of a wide range of opto electronic devices.

According to the invention there is provided the use of a multi-functional, chromophore containing, polymerisable compound for producing an optical element having non-linear optical properties (an NLO element) wherein the multi-functional chromophore is a compound capable of being polymerised into a cross-linked network and of being poled under the influence of an electric field whilst being polymerised into the cross-linked network, the compound having the generalised formula (D) (C) (A) (F)

D, C, A and F representing covalently linked moieties where C represents at least one conjugated system of $\pi$-bonds, A and D represent at least one, respectively $\pi$-electron acceptor and $\pi$-electron donor groups linked at opposite ends of the conjugated system, and are preferably conjugated with the conjugated system of $\pi$-bonds (C) and where more than one moiety A, C or D is present they may the same or different, F represents at least two polymerisable functional groups, which may be the same or different, attached to the $\pi$-conjugated system C or the groups A and D via substituent groups $R_1$ and $R_2$, where $R_1$ and $R_2$ are selected from alkyl, cycloalkyl, aryl heteroalkyl, alkenyl, cycloalkenyl, alkynyl including groups which have been substituted or contain heteroatom replacement, the groups F being linked to the compound so that after the compound has been polymerised to give a cross-linked network the interpolymerised functional groups prevent significant realignment of the chromophore groups when the optical element is subject to temperature changes during any further fabrication and in use.

It will be appreciated that in forming cross-linked networks from multifunctional reactants it is not possible to ensure that every molecule is linked into the network by reaction of functional groups at both ends of the molecule. Nevertheless, in practical terms where the molecule has functional groups in positions which are capable of being polymerised into a polymer network so that realignment of the chromophore groupings relative to each other would be prevented then sufficient interpolymerisation of the functional groups can readily be achieved under normal polymerisation conditions to provide the required degree of stability with respect to temperature. For those compositions where the proportion of functional groups polymerised into the network is 60 to 70%, i.e. using free radical polymerisation more than two groups F are preferred per chromophore group. Where the reaction can go to greater than 80% such as by condensation or Michael addition reaction two or less groups F per chromophore group are sufficient.

Suitable $\pi$-conjugated systems include aromatic ring systems (e.g. benzene), condensed aromatic ring systems (e.g. naphthalene), (poly)ene system (one or more conjugated $\pi$-bonds), (poly)yne system (one or more conjugated acetylene bonds), quinomethide systems, any of the above substituted by one or more hereratom replacement(s) of a carbon atom(s) (e.g. thiophene, furan, pyridine, pyrrole), and/or by one or more heteroatom replacement(s) of a C=C double bond(s) and combinations of the above with or without heteroatom replacement(s). The $\pi$-conjugated system can be optionally substituted. Such optional substitution may form a carbocyclic or heterocyclic ring, condensed or appended to the $\pi$-conjugated system.

Specific examples of $\pi$-conjugating systems are:

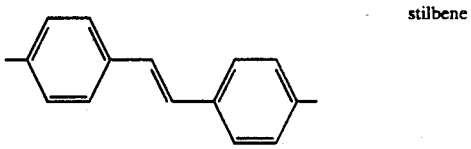

stilbene or

-continued

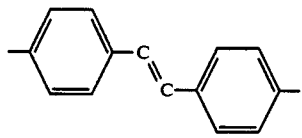
imine

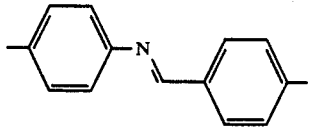
arylazo

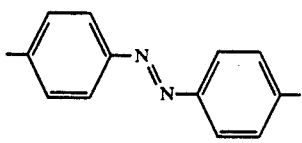
hydrazone (-pyrazoline)
m = 0 or 1
n = 0 or a +ve integer, preferably less than 10

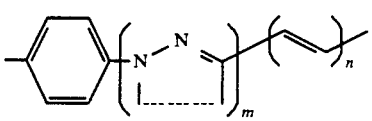
polyene
m = 0 or 1
n = 2 or more

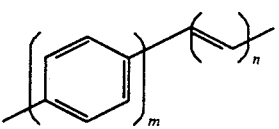
(poly)acetylene
n = 1 or more

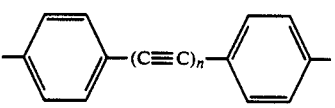
stilbazolium

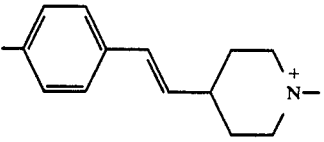
styrene

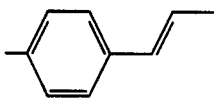
benzenoid

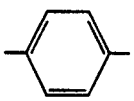

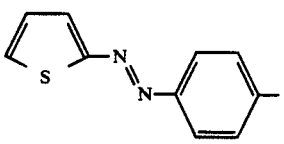
azothiophene

The π-electron donor substituent(s), D, appended to the π-conjugated system are to be taken preferably, but not exclusively, from the following: amino, $NR^1R^2$; thio, $SR^1$; oxy, $OR^1$; phosphino, $PR^1R^2$, where $R^1$ and $R^2$ are organic substituents selected from: alkyl, cycloalkyl, aryl, heteroaryl, alkenyl, cycloalkenyl, alkynyl, any of which may be optionally substituted and contain heteroatom replacements.

The π-electron acceptor substituent(S), A, may be selected preferably, but not exclusively, from the following: nitro, $NO_2$; cyano, CN; nitroso, NO; ester, $CO_2R$; amide, $CONR^1R^2$; ketone, $COR^1$; formyl, COH; sulphone, $SO_2R^1$; sulphoxide, $SOR^1$; sulphonate ester, $SO_3R^1$; sulphonamide, $SO_2NR^1R^2$; phosphonate, $P(=O)OR^1OR^2$; phosphine oxide, $P(=O)R^1R^2$; boronate ester, $B(OR^1)OR^2$; N-pyridinium and substituted variants, and other positively charged quaternary salts. Also to be taken as suitable acceptor groups are heteroatoms especially nitrogen, when replacing carbon in an aromatic ring or olefinic link of the conjugated system, and more especially also quaternised versions of the same (eg stilbazolium). $R^1$ and $R^2$ are organic moieties as outlined above.

The cross-linkable moieties, (F), attached to the NLO chromophore are chosen from amongst the organic groups known to take part in cross-linking reactions, such as: acrylate esters, acrylamides, epoxides, isocyanates, cyanates, hydroxy, amino, maleimide. These are optionally further substituted, e.g. by methyl to methacrylate esters or methacrylamides.

Non-eliminating addition reactions are the preferred cross-linking mechanism. In the case where functional group, $F^1$, (e.g. maleimide or epoxy) can only react with functional group, $F^2$, (e.g. amino or hydroxy), the functionalities can either be incorporated on each molecule or on separate molecules. In the latter case reaction can only occur when the separate molecules are used in mixtures. This has the advantage of preventing premature reaction.

The cross-linkable moieties are suitably attached to the NLO chromophore by means of one or more of the following: direct bond, (poly)methylene, (poly)arylene, (poly)oxymethylene or (poly)oxypropylene chain. These are optionally substituted by appendage of one or more substituent(s), and/or by heteroatom replacement (eg ether, ester linkages). The attachment can be to π-conjugated system of the NLO chromophore, or can be via substituents $R^1$ and $R^2$ attached to the π-electron acceptor group(s), (A), or the π-electron donor group(s), (D) above. In the case of attachment via π-donor groups, convenient substituents are dialkylamino, alkyl amino, alkylthio, alkoxy, alkoxy, ester, amide. In the case of π-acceptor groups, convenient substituents are ester, $—CO_2R^1$; amide, $—CONR^1R^2$; sulphonamide, $—SO_2NR^1R^2$; sulphonate ester, $—SO_3R^1$; sulphone, $—SO_2R^1$; sulphoxide, $—SOR^1$; ketone, $—COR^1$; boronate ester, $—B(OR^1)(OR^2)$; phosphine oxide, $—P(=O)R^1R^2$ and phosphonate ester.

These cross-linkable groups are positioned around the molecules so that after cross-linking the molecule is held rigidly in the polymer matrix and is substantially prevented from realignment during thermal cycling. The molecules are prevented from realignment by having at least one cross-linkable group positioned at one terminus of the molecule and at least one other at either the other terminus or appended to the side of the molecule remote from the first cross-linkable group. One or two of the at least two polymerisable groups can be used to produce a linear or branched oligomer or polymer containing the molecules which have at least one further substituent cross-linkable group to enable formation of a cross-linked network to be formed locking in the orientation after the molecules have been poled. Other arrangements of the appended cross-linkable groups are possible as long as the NLO molecule is substantially prevented from realignment after cross-linking. The positioning of functional substituents around the NLO compound has the additional benefits of providing high solubility in solvents, of inhibiting crystallisation and phase separation effects whilst processing formulations containing the compounds, and on the optical transparency of the films.

Preferred structures by way of illustration include the following, those containing azo-linkages are preferred as the link is particularly suited to photo-oxidative "printing" of optical circuitry in films of the invention:

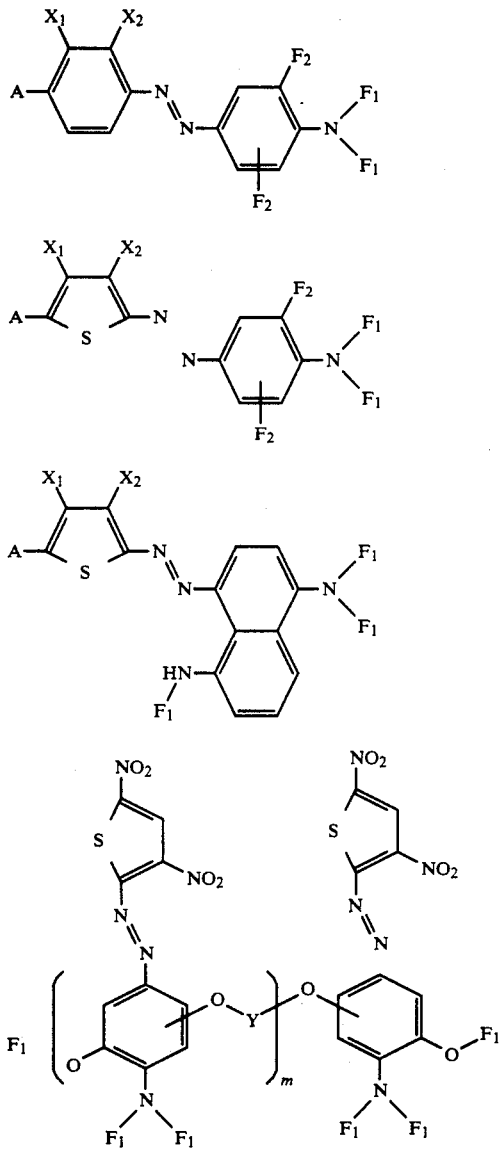

where A=NO$_2$, CN
m=0 to 100
F$_1$=

$-\text{(CH}_2\text{)}_n\text{O}-\overset{\text{O}}{\overset{\|}{\text{C}}}-\overset{\text{H}}{\overset{|}{\text{C}}}=\text{CH}_2$ or $-\text{(CH}_2\text{)}_n\text{NH}_2$ F$_2$=—O—F$_1$ or H or CH$_3$ or C$_2$H$_5$
X$_1$ and X$_2$=—COO—F$_1$ or H or A and Y is —(CH$_2$)$_n$, where n is an integer between 1 and 6,

of is an F$_1$ substituted linking group, eg

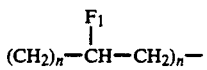

As previously indicated the multifunctional, chromophore-containing compounds can be converted into linear or branched oligomeric or polymeric compounds which are subsequently convertible into networks, having the locked-in NLO properties (by virtue of being cross-linked). For convenience of handling and fabrication it may be advantageous to use such intermediate products rather than the monomeric form of these materials. Intermediate products are more readily handled at the poling stage.

In a further aspect of the invention the compounds of the invention in either monomeric or partially cured form are made up into formulations in solvents such as toluene. These formulations will contain auxiliary materials which confer benefits on either the processability of the compounds and the ease of forming useful intermediate materials and on the properties of the materials formed after curing. Typical auxiliary constituents include polymeric additives, polymerisation initiators, accelerators and retarders, additives to control the surface energy of deposited coatings and additives to control adhesion of films of the compounds to either substrates or overlying films. The ingredients of the formulation will be selected so that crystallisation does not occur when the solvent is removed during film and waveguide fabrication.

In the cases where the NLO compound is not polymeric the addition of polymeric additives is of benefit in providing a formulation with good rheological properties. For example in the case of compounds functionalised with methacrylate or acrylate groups, polycarbonate or polymers and copolymers of methyl methacrylate can be usefully incorporated. The preferred concentration range of added polymer is 1 to 20% by weight and more preferably 5 to 15% by weight of the composition. The added polymer conveys several benefits. The rheology of the formulation can be controlled. A non-tacky or "dry film" can be produced after solvent removal (during film fabrication) which has the advantage that additional coatings can be deposited on the surface prior to polymerisation. Additionally, shrinkage of the coating during thermal cure is minimised. Furthermore the flexibility and toughness of the film and adhesion to substrates can be controlled.

Formation of the cross-linked network by polymerisation is controlled by the nature of the functional groups and through the addition of polymerisation initiators, accelerators or retarders. Suitable polymerisation initiators or initiating systems for acrylate/methacrylate functionalised compounds may include organic peroxy compounds such as peroxides (di-lauryl peroxide, dibenzoyl peroxide, di-t-butyl peroxide), peracids, peresters (t-butyl per 2-ethyl hexanoate, t-butyl perbenzoate), percarbamates and percarbonates (bis 4-(t-butyl cyclohexyl) peroxy dicarbonate). In general initiators that contain ionic or metallic species are not preferred as the electrical resistivity of the formulation must be maximised. Typical concentrations are in the range 1 to 10% by weight of the polymerisable constituents of the composition.

In the case where polymerisation is controlled using the functional groups, twin pack formulations can be used in which one pack contains only one type of functionality (for example epoxy) and the second pack contains different functional groups (for example amine) that will only form a network when reacted with functional groups in the first pack. Non-centrosymmetric network formation can be achieved in a more controlled manner using such functionality, for example if the donors are functionalised with a group (for example amine) that will only react with a different group attached to the acceptors (for example maleimide).

Formulations containing surface active additives are particularly useful. These enable fabrication of films with surfaces that are glossy and free of defects such as surface ripple and "orange peel" under a wider range of conditions than when they are absent. Suitable surfactants include commercially available additives such as FC430 (3M), an aromatic fluoropolyester and DC57 (Dow Corning), a siloxane additive. Typical concentrations are 10 to 1000 ppm, preferably 50 to 250 ppm by weight of the composition.

Formulations are provided which enable films to be produced which exhibit at least two functions or type of property. For example, a film with a large electro-optic coefficient due to the presence of NLO chromophores and that is photoconducting is obtained by introducing a molecular moiety that is able to generate a charge, such as a phthalocyanine. Suitable phthalocyanines are described in European Patent Publications 262 761. 155 780 and U.S. Pat. No. 4,606,895. Moieties that are able to transport or trap charges may also be incorporated. This combination of functions provides a film that is photorefractive, i.e. the refractive index of the film can be changed at wavelength x by illuminating the film at wavelength y.

The formulations of the invention are particularly useful for use as film forming compositions and may be dissolved in a suitable solvent and then coated onto various rigid and flexible substrates such as fibres and planar substrates, which may be metallised, including semiconductor wafers (Si, GaAs etc), glass or films of polyethylene terephthalate, polyimide, polycarbonate, aromatic polyether sulphones and ketones. Suitable coating techniques include those used by the semi conductor processing industry such as spin and dip coating and those used by the printing industry such as bead and gravure coating.

Thus the invention includes coating formulations comprising compounds of the invention in monomeric or partially polymerised form dissolved in a solvent at a concentration enabling films of thickness between 0.1 and 10 micron having a thickness variation of better than ±50 nm, preferably better than ±25 nm, to be produced. Suitable concentrations will depend on the active-NLO compound used but will be within the range 1 to 50% by weight with the range 5 to 30% being the most useful. Articles comprising rigid or flexible substrates carrying a coating deposited from such a coating formulation are also included.

Films made from the products of the invention are generally used in combination with other films or coatings. Polymerisation of the formulations containing the network formable NLO compounds may be effected before or after deposition or lamination of further layers. When deposition is performed before polymerisation it is preferable to ensure all residual solvent is removed by applying a vacuum and to partially polymerise to an extent less than that required for network formation. Suitable polymers for use in multilayer films providing the layer or layers other than that formed from the compounds of the invention include passive thermal or radiation curable resins such as urethane acrylates, polymers and copolymers based on methyl methacrylate and substituted (meth)acrylic acid such as cyclohexyl methacrylate and radiation or chemically cross-linkable amorphous polyolefins. Additives to improve interfacial adhesion between the polymer layers can be beneficially employed. For example silane coupling agents such as methacryloxypropyl trimethoxysilane A174 (Union Carbide) can be incorporated to improve adhesion to glass or semi-conductor substrates.

In order to obtain polar molecular orientation of the NLO compounds of the invention it is necessary to perform the polymerisation whilst applying an aligning force such as a DC electric field so that the polar alignment is locked into the polymerised network. Polar alignment is achieved through coupling of the field with the dipoles of the molecules. Suitable methods include poling via electrodes or by a corona field. Electrodes deposited either side of the film can be used for achieving alignment perpendicular to the plane of the film. Parallel tracks deposited below or above the film provide alignment in the plane of the film using the fringe field. Corona poling can be achieved using a single point, such as a needle, or a wire, or a mesh. A positive discharge is preferred to a negative discharge. It is preferred that the poling temperature is at or below the glass transition temperature of the polymer prior to application of the field and commencement of full network formation. In a typical process, films are deposited on a substrate which may or may not be metallised which is coated with a passive polymer buffer layer such as a cured urethane acrylate. It is preferable to partially cure the film, in an atmosphere of nitrogen, using a hot plate to control the polymerisation conditions or to use a preformed polymer of the invention before progressing to full network formation with a field applied. The electrode or hot plate is connected to earth via a current limiting resistor (typically 10 MOhm) to minimise electrical breakdown of the film. A corona discharge of +10−15 KV is typically applied over a film to pin distance of 15-30 Mm whilst polymerisation is effected. When polymerisation is complete it is preferable to cool to room temperature with the field still applied.

Poled films produced from formulations of the invention are suitable for various uses. These include "electro-active optical thin film channel waveguides". These differ from optic fibre waveguides as follows. An optic fibre comprises an inner higher refractive index core surrounded by a lower refractive index cladding. Light passed down the fibre is confined by total internal reflection to the high index core of the fibre. The core of the fibre which guides the light is termed a "waveguidel". In an "optical thin film waveguide" light is confined within a thin film (typically between 0.5 and 2.0 um) having a refractive index higher than the adjacent media. The adjacent media may also be thin films, forming a "sandwich", with the guiding layer at the centre, or one or both may be thicker (in the form of a bulk substrate), or one medium may be air. The difference in refractive index between the guiding layer and the surrounding media confines the light to a plane (in the region of 1.5 μm thick). The term "channel waveguide" is applied when light is confined further to follow a line (or a curved path) by a stripe of higher refractive index within the plane. The term "electro-active thin film waveguide" is used to describe a waveguide whose optical properties can be changed by applying an electric field either via electrodes positioned so that the field passes through the waveguide or using the electric field of light itself.

Films produced from the compounds of the invention can be used to form channel waveguides. Suitable methods for introducing optical circuitry or patterns of channel waveguides by producing regions of different refractive index include the following:

a) decreasing the refractive index of the material surrounding the waveguide circuit by exposure to radiation for example photo-bleaching, b) increasing the optical thickness of the channel waveguide region of the film with respect to the surroundings using techniques such as embossing or by reducing the thickness of the surrounding materials using techniques such as plasma etching or embossing or photopolymerisation of a channel waveguide rib (using a mask) and evaporative removal of surrounding monomer to a reduced thickness followed by polymerisation of this region.

c) increasing the effective refractive index of the channel by incorporation of a thin region of high refractive index between the substrate and the active layer.

Terms used to describe the optical properties of the film are as follows. The term "electro-optic coefficient" (EO coefficient) as employed herein refers to any component of the electro-optic tensor $r_{ijk}$, as defined, for example in "Quantum Electronics" (2nd edition), by A Yariv (Wiley, New York, 1975), chapter 14.

Reduced tensor notation may be used, as described in "Physical Properties of Materials", by J F Nye (O.U.P. 957), p. 247 (where the notation $z_{ijk}$ is used in place of the more usual $r_{ijk}$) to reduce the number of subscripts from three to two according to the convention:

$$r_{ijk} \rightarrow r_{mk}$$

| i,j | 1,1 | 2,2 | 3,3 | 2,3 | 1,3 | 1,2 |
|-----|-----|-----|-----|-----|-----|-----|
| m   | 1   | 2   | 3   | 4   | 5   | 6   |

The term "effective electro-optic coefficient ($r_c$)" as employed herein refers to the particular combination of electro-optic coefficients and refractive indices, that for a given material geometry and given polarisation directions for input optical field, and given direction of the applied d.c. or low frequency electric field, which behave in the same way as the single coefficient, $r_c$, in determining the optical response of the medium to the applied electric field. For example, in the description of a planar transverse electro-optic waveguide modulator, with the electric field applied along the z-axis, beam propagation along the y-axis and the light polarised at 45° to the x and z-axes, the expression for the phase difference $\delta\theta$ induced between the z- and x-polarised components of the beam, of wavelength λ is given by the expression $$\delta\theta = (\pi\lambda) \cdot (n_z^3 r_{zzz} - n_x^3 r_{xxz}) \cdot V \cdot (l/d)$$

where V is the voltage applied between the electrodes, which are spaced a distance d apart, and L is the distance the beam travels through the electro-optic medium. In this case the effective electro-optic coefficient is defined as $$r_c = r_{zzz} - (n_x/n_z)^3 \cdot r_{xxz}$$

and the expression for $\delta\theta$ can be re-written in the compact form $$\delta\theta = (\pi\lambda) \cdot n_z^3 \cdot r_c \cdot V \cdot (l/d)$$

The term "half-wave voltage" as employed herein is defined as the voltage required to change the phase of the light transmitted through a particular geometry of an electro-optic medium by π radians. The relationship between the half-wave voltage and other material parameters such as refractive indices and electro-optic coefficients will depend on the particular geometry under consideration.

The term "optical loss" as employed herein, with reference to optical waveguides is defined as the amount of light lost from the input beam during propagation through the waveguide (excluding losses occurring during coupling the light into and out of the waveguide) and is given by the equation $$loss = (10 \cdot \log_{10}[I_o/I])/l$$

where $I_o$ and $I$ are the intensity of the light at two points separated by a distance l within the waveguide. If the distance l is measured in centimeters the loss is measured in units of decibels per centimeter (dB/cm).

The properties of the films and multilayers can be characterised as follows; Assessment of the waveguiding properties of thin film layers, or multilayer composites, has been achieved using prism coupling techniques (as described for example by T. Tamir, in "Integrated Optics", Topics in Applied Physics Volume 7, springer Verlag 1979, sections 3.1.2 and 3.1.5). A qualitative assessment of different waveguides may be obtained by comparison of the fraction of an incident laser light beam that is transmitted through a given length of waveguide, using prisms to couple the light in and out of the film.

Measurement of thickness and refractive index of thin films can be achieved simultaneously if the film forms a planar waveguide supporting two or more discreet waveguide modes. Prism coupling techniques are used to couple laser light into and out of the waveguide. The techniques and supporting electro-magnetic theory are fully described, for example, by F. Zernicke in "Integrated Optics" (ed. T Tamir, Topics in Applied Physics, Volume 7, Springer Verlag 1979). The film of interest can be deposited either directly onto a substrate of known refractive index, or onto another polymeric film, whose refractive index is known.

Refractive indices of films not suitable for use as optical waveguides (by virtue, for example, of their optical absorption or surface quality) can be measured by the determination of the critical angle for total internal reflection from the interface between a high refractive index prism and the film of interest.

The optical losses of thin film optical planar waveguides (single mode or multimode) have been measured using the "clamped-on prism" technique described by Zernicke ("Integrated Optics", ed T Tamir, Topics in Applied Physics Volume 7, Springer Verlag 1979, p 218).

The effective electro-optic coefficient of the non linear optical waveguides is measuring using prism coupling into and out of a planar waveguide, as described for example by A Buckley and J B Stamatoff ("Non linear Optical Effects in Organic Polymers", J Messier et al (eds.) NATO ASI Series, volume 162, Kluwer Academic Publishers, 1989, pp 327-336). Modulation of the intensity of the output beam is achieved by the application of alternating electric fields across the sample, thus altering the phase relationship between the orthogonally polarised waveguide modes.

The stability of non-linear optical elements with respect to various elevated temperature treatments was measured by monitoring changes in second harmonic generation (SHG) since the electro-optic coefficients $r_{33}$ and $r_{13}$ are related to the coefficients governing SHG , $d_{33}$ and $d_{13}$ , through the relationship defined by A. Yariv in "Quantum Electronics", 2nd edition, John Wiley & Sons, N.Y., 1975.

$$d_{jkl} = \frac{\epsilon_j \epsilon_1}{2\epsilon_o} r_{jlk}$$

where $\epsilon_i$ are the principal components of the dielectric permittivity at optical frequences, and $\epsilon_o$ is the low frequency dielectric permittivity.

The technique can be used to measure relative changes in activity even if significant absorption occurs at the fundamental frequency or more likely the second harmonic frequency. Two methods of assessing optical stability are described below. The first used apparatus constructed so that the second harmonic could be observed from a sample placed on a heating stage during the process of electric field poling and network formation and after removal of the field and subsequent thermal cycling. In the second method fabricated waveguides were placed in a constant temperature oven at 60° C. and were periodically removed and the level of SHG measured over a period in excess of 1000 hours. These methods are described in detail in Example 10.

In a further aspect of the invention there is provided a thermally stable, non-linear optical element comprising a poled, functional chromophore compound of the invention incorporated in a cross linked polymer network characterised in that after annealing the optical element at 60° C. for 1 hour the normalised second harmonic generation intensity (SHG) falls by less than 10% when the optical element is held at 60° C. for a further 1000 hours.

A preferred optical element will exhibit a drop of less than 50% in the normalised second harmonic generation intensity (SHG) after heating at a rate of 5° C./min from room temperature to 150° C.

A typical example of an optical element according to the invention comprises a cured and poled film formed from a multifunctional chromophore-containing compound as described incorporated by spin-coating into a multilayer structure comprising for example a glass substrate, a metallic electrode, a cross-linked passive polymer buffer layer, a cured and poled NLO formulation, a top polymeric buffer layer (optionally also obtained from a curable composition), and a top electrode having the following optical properties; (optical loss less than 2 db/cm, EO coefficient, $r_{33}$ greater than 5 pm/V, less than 10% loss in EO coefficient after 1000 hours at 60° C. etc, for example measured as the loss in normalised SHG as described above.

A further optical element according to the invention comprises a multilayer film deposited on a flexible substrate which optionally may contain a release coating at either the substrate metallic foil interface or at the metallic foil—bottom buffer layer interface or when no metallic foil is used at the substrate—bottom buffer interface. The top or bottom buffer layer or the NLO formulation may be either a passive or electroactive "dry film" formulation protected with a readily removeable polymer film such as polyethylene. The product can be used in a device where the flexible substrate has a printed electrical circuit on the surface (an optoelectronic flexible printed circuit board) or the product can be used to laminate an optical waveguide (pre or post patterning) on to a flexible or rigid substrate containing electrical circuitry such as a semiconductor wafer.

The present invention is now illustrated but not limited by the following examples.

PREPARATION 1

Preparation of 4-Chloro-3-nitrobenzene-N,N-bis (2-hydroxyethyl) sulphonamide

To a stirred solution of 4-chloro-3-nitrobenzene sulphonyl chloride (157.65 g; 0.616 mol) in acetone A.R. (300 ml), diethanolamine (155.19 g; 1.478 mol) was added dropwise at <20° C. over 1 hour. After stirring for a further 1½ hours at <20° C. the yellow/brown reaction mixture was poured into ice/water (1500 g) with stirring. The resulting mixture was stirred for 1½ hours and then the pH adjusted to pH7 by the addition of concentrated hydrochloric acid SG 1.18, filtered and washed copiously with water (3 liter). The residue was dried (40° C. vac oven) to give a pale yellow solid (156.89 g; 78% m.pt.96°)

Analysis found C, 36.5; H,3.8; N,8.1; S,9.9;
$C_{10}H_{18}N_2O_6SCl$ requires C, 36.99; H,4.04; N,8.63; S,9.87%

PREPARATION 2

Preparation of 4-[N,N'Bis-(2-hydroxyethyl)aminosulphonyl]-2-nitroaniline

The chlorobenzene derivative from Example 1 (150 g; 046 mol) was stirred with water (600 ml) and liquid ammonia (600 ml) in an autoclave at 80° C. After 10 hours the reaction mixture was cooled and the ammonia blown off and the suspension filtered. The resulting residue was recrystallised from meths:water (1:1) to give after drying a yellow crystalline solid (87.17 g; 62%; m.pt. 173-175° ).

Analysis found C, 39.7; H,4.9; N, 13.8; S, 10.2
$C_{10}H_{15}N_3O_6S$ requires C, 39.34; H,4.95; N, 13,76; S, 10.50%

PREPARATION 3

Preparation of 4-[N,N-Bis-(2-hydroxyethyl) aminosulphonyl]-4'-[N,N-bis-(2-hydroxyethyl)aminol-2-nitro-azobenzene To a stirred mixture of the aniline from Preparation 2 (53.34 g; 0.175 mol), glacial acetic acid (800 ml) and water (400 ml), concentrated hydrochloric acid (87.5 ml SG.1.18) was added at 5° C. The resulting yellow mixture was cooled to 0° C. and 2N sodium nitrite solution (98 ml; 0.196 mol) added dropwise at <0° C. over 20 min. After stirring for a further 1 hour at <0° C. the excess nitrous acid was destroyed by the addition of 10% (w/v) sulphamic acid solution as shown using 1% sulphone indicator. The resulting diazonium solution was added rapidly to a stirred solution of N-phenyl-diethanolamine (31.68 g; 0.175 mol) in acetone A.R. (1 liter) at <5° C. (maintaining the temperature at <5° C. by the addition of ice when necessary). The red solution was then neutralised by the addition of anhydrous sodium acetate as shown using congo red indicator paper and then diluted with water to give a total volume of 4,000 ml. After stirring overnight at room temperature the mixture was filtered and washed with water (2 liter) to give after drying (80° C. vac. oven) a red solid (59.58 g; 68%).

T.L.C. silica/chloroform:methanol (10:1) $R_f=0.15$
Analysis found C,48.3; H,5.3; N,13.7; S,5.2;
$C_{20}H_{27}N_5O_8S$ requires C,48.28; H,5.47; N,14.08. S,6.45%

EXAMPLE 1

Preparation of 4-[N,N-Bis-(2-methacryloxyethyl) aminosulphonyl]-4'-[N,N-(Bis-(2-methacryloxyethyl) amino]-2-nitroazobenzene To a stirred mixture of the azo compound from Preparation 3 (15.00 g, 0.03 mol) and methyl methacrylate (150 ml) containing Topanol 'O' (0.015 g) under a positive stream of air, was added dioctyl tin oxide (7.50 g). After stirring at reflux for 12 hr the reaction mixture was cooled and the solvent removed by evaporation under reduced pressure. The resulting red oil was purified by flash chromatography, eluting with hexane, gradually increasing the polarity with ethyl acetate, and then recrystallised from 95% ethanol to give after drying (40° C. vac oven) an orange solid (10.15 g; 44%; m.p. 71–72° C.).

$^1$H nmr (CDCl$_3$, 250 MHz; TMS) 1.95 d (12H), 3.62 t (4H), 3.82 t (4H), 4.30–4.47 m (8H), 5.60 m (4H), 6.10 m (4 H), 6.90 d (2H), 7.78–8.03 m (4H), 8.27 d (1H)
ir (Kbr disc) 3095, 1718, 1602, 1402, 1348, 1157, 939 cm$^{-1}$.

Analysis found C,55.7; H,5.5; N,8.6;
$C_{36}H_{43}N_5O_{12}S$ requires C,56.17; H,5.63; N,9.10%

EXAMPLE 2

4'(N-Ethyl-N-2-methacryloxyethyl)amino-4-(N-methacryloxyethyl-N-methylaminosulphonyl)-2-nitroazobenzene To a stirred mixture of 4'-(N-ethyl-N-2-hydroxyethylamino)-4-(N-2-hydroxyethyl-N-methylaminosulphonyl)-2-nitroazobenzene (10.00 g; 0.022 mol prepared from intermediates analogous to Preparations 1 and 2, as described in Preparation 3) and methyl methacrylate (100 ml) containing Topanol 'O' (0.01 g) under a positive stream of air, was added dioctyl tin oxide (5.00 g). After stirring at reflux for 6 hours the reaction mixture was cooled and the solvent removed by evaporation under reduced pressure. The resulting red oil was purified by flash chromatography eluting with hexane, gradually increasing the polarity with ethyl acetate and the product was recrystallised from 95% ethanol to give after drying a red solid (6.22 g; 48% m.p. 80°–84°).

$^1$H nmr (CDCl$_3$; 250 MHz TMS) 1.30 t (3H), 1.95 s (6H), 2.95 s (3H), 3.45 t (2H) 3.53 q (2H), 3.75 t (2H), 4.32–4.41 m (4H), 5.60 m (2H), 6.15 m (2H), 6.82 d (2H), 7.80–8.02 (4H), 8.23 d (1H).

ir (KBr disc) 3105, 1725, 1603, 1516, 1344, 1149, 712 cm$^{-1}$.

Analysis found C, 54.7; H, 5.7; N, 11.7; S, 5.6;
$C_{27}H_{33}N_5O_8S$ requires C, 55.19; H, 5.66; N, 11.92;

EXAMPLE 3

4'-(2-Bis-methacryloxyethylamino)-2-(2-bis-methacryloxyethylsulphonyl)-4-nitroazobenzene To a stirred mixture of 2-(2-hydroxyethylsulphonyl)-4'-(bis-2-hydroxyethylamino) 4-nitroazobenzene (10.00 g; 0.0228 mol, prepared as Preparation 3) and methyl methacrylate (100 ml) containing Topanol 'O' (0.01 g) under a positive stream of air, was added dioctyl tin oxide (5.00 g). After stirring at reflux for 5½ hours the reaction mixture was cooled and the solvent removed by evaporation under reduced pressure. The resulting red oil was purified by flash chromatography eluting with hexane gradually increasing the polarity with ethyl acetate and the product was recrystallised from meths to give after drying (40° C. vac oven) a red solid (2.56 g; 17%; m.pt. 94°–60°).

$^1$H nmr (CDCl$_3$; 250 MHz; TMS) 1.70 s (3H), 2.00s (6H), 3.90 t (4H) 4.08t (2H), 4.43 t (4H), 4.60 t (2H), 5.48 m (1H), 5.65 m (3H), 6.15 m (2H), 6.95 d (2H), 7.88–8.05 m (3H), 8.48 dd (1H), 9.00 d (1H).

Analysis found C, 56.4; H, 5.3; N, 8.8; S, 5.5;
$C_{30}H_{34}N_4O_{10}S$ requires C, 56.07; H, 5.33; N, 8.72; S, 4.99%

EXAMPLE 4

Preparation of a Typical Formulation for Spin Coating Based on a Typical Formulation of:

87.5 wt. % NLO dye (as Example 1)
5.0 wt. % PMMA polymer or copolymer
2.5 wt. % di-t-butyl peroxide (obtainable from Interox Chemicals Ltd)
2.5 wt. % di-lauroyl peroxide (obtainable from Interox Chemicals Ltd)
2.5 wt. % t-butyl perbenzoate
100 ppm FC430 surfactant (obtainable from 3M Corporation)
100 ppm DC57 surfactant (obtainable from Dow Corning)

A solution comprising 25 wt. % solids for spin coating of an NLO film is prepared as follows:

The NLO functionalised dye is weighed into an amber 10 ml sample bottle. The thermoplastic polymer is then added from a previously prepared 5 wt. % solution in toluene. The toluene (BDH) had been dried and distilled. The polymer used was LG156 PMMA copolymer. CA603 homopolymer is a suitable alternative. Both these polymers are obtainable from ICI PLC. All three peroxides are added to the bottle individually from previously prepared 10 wt. % solutions in toluene. Similarly, the surfactants, already in 0.1 wt. % solutions in toluene, are added to the mixture. Further toluene is added to the composition to give the desired solids content for spin coating. To ensure complete solubility the mixture in the bottle is either shaken or placed within an ultrasonic bath before filtration takes place through a 0.2 μm filter in another amber bottle. The solution is now ready for the film deposition process by spin coating.

EXAMPLE 5

Spin Coated Film—Effect of Surfactants

The formulation described in Example 4 was spin coated to produce thin films, with and without the presence of surfactants, using a Headway PWM 101 spin coater. In the absence of surfactants, films free of surface ripple could not be achieved reproduceably and would not waveguide. Formulations containing surfactants reproduceably provide ripple free surfaces and films that will waveguide. Precise control of film thickness is achievable by varying concentration and spin speed. For example at 700 rpm the film thickness is 1.70 μm, measured using an Alpha Step 200 surface profilometer (Tencor Instruments). At 1000 rpm, thickness equals 1.42 μm and at 2500 rpm the value is 1.25 μm.

EXAMPLE 6

The Storage Stability of Three samples with Differing Functionality were Assessed as Follows Formulated uncured resin samples were introduced, by capillary action, into a 7.5 am gap between two glass slides, coated with a transparent electrically conductive coating of indium tin oxide (ITO) on the inner surfaces. The gap and hence resin thickness was controlled by a spacer around the boundaries of the slides. This assembly is hereafter called the sample cell. Electrical poling was achieved by applying a voltage between the two ITO electrodes in excess of 150 Volts DC.

The cell was mounted in an apparatus designed for the purpose of measuring SHG. The apparatus consisted of a Quantel YAG laser operating in Q-switched mode at a wavelength of 1.064 μm. The laser was propagated through the cell and the SHG was recorded using a photomultiplier linked to a boxcar averager (Stanford SRS 256) interfaced to an IBM PC microcomputer. A rotation stage on which the cell was mounted, was used to vary the angle of the laser beam with respect to the poling direction (perpendicular to the electrode faces). The angle at which the peak SHG intensity is observed in the Maker fringe pattern (P.D. Maker et al Phys. Rev. Lett. 8,21 (1962) was determined and then fixed. NLO activity measured by the SHG intensity was monitored as a function of time.

Sample 1

A cell was filled with a formulation comprising:
95 wt. % 'Diacryl' 101 (Akzo Chemie) ethoxylated bis-phenol A dimethacrylate
2 wt. % 'Disperse Red I', unfunctionalised NLO material, obtainable from Aldrich Chemical Company Ltd.
0.5 wt. % Interox TBPEH, t-butyl per 2-ethyl hexanoate, thermal initiator.

This sample was fully cured thermally using a hot air gun whilst a poling field of 150 V was applied. The sample was allowed to cool to room temperature. The SHG signal was monitored. Turning off the poling field resulted in an immediate drop in SHG by more than 50% of the original value. Within 5 minutes the SHG had fallen to 20%, after 18 mins to 16% and after 15.5 hours to 4%.

Sample 2

A cell was filled with a formulation comprising:
95% "Photomer 6261" (Lankro Chemicals Ltd) urethane acrylate
2% of the compound shown below with two functional groups at one end of the chromophore
3% Interox TBPEH

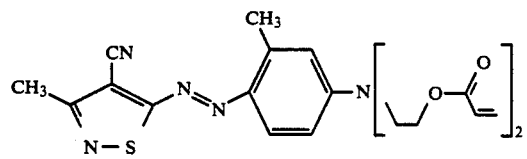

The sample was treated in the same way as sample 1. At room temperature the poling field was removed and an immediate drop (<2 secs) to 50% of the starting value was observed. After 5 mins the value was 33%, after 45 mins 30% and after 2 days no further measureable decrease was observed.

Sample 3

A cell was filled with a formulation comprising:
46.5% "Photomer 6261" (Lankro Chemicals)
46.5% Trimethylolpropane Trimethacrylate
2% of the compound shown below
5% Interox TBPEH

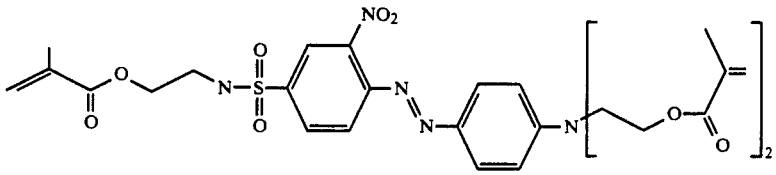

The sample was treated in the same way as sample 1. At room temperature, after removal of the field an immediate drop (<2 secs) to 76% of the initial value was detected. No further reduction of signal was detected after two hours and after periodic checks up to 259 days.

EXAMPLE 7

Tetrafunctional Dye Waveguide Device

An indium tin oxide (ITO) coated glass substrate approximately 1.5 mm thick was coated with a 1.5 μm thick film of the following composition:
100 parts Photomer 6261 resin (Lankro Chemical)
5 parts Irgacure 651 photoinitiator
150 ppm DC57 surfactant
150 ppm FC430 surfactant formulated as a solution containing 27.5% solids by weight in toluene.

The composition was spin coated onto the ITO-coated side of the substrate, using a spin-speed of 1750 rpm. The polymer film (hereafter called the bottom layer) was cured by exposure for a total of 24 seconds to the UV radiation from a pulsed Xenon lamp (Xenon Corporation RC-250A), followed by heating at a temperature of 150° C. for one hour on a hotplate. A film of a second composition (the NLO layer) was then coated on top of the bottom layer. This composition comprised of
87.5% tetra-methacrylate dye (Example 1)
5.0% 'Diakon' LG156 polymethylmethacrylate copolymer (obtainable from ICI PLC)
2.5% di-lauryl peroxide thermal initiator
2.5% di-t-butyl peroxide thermal initiator The composition was spin-coated at 1200 rpm to form a film of 1.5 μm thickness. The bilayer sample was placed on a fused silica sheet approximately 1 mm thick (which acts as an electrical insulator), which in turn is placed directly on a hotplate in a dry nitrogen atmosphere. The conducting ITO coating between the glass substrate and the bottom buffer layer was electrically connected to earth via a 10 MΩ current-limiting resistor. A steel needle, connected to the positive terminal of a high voltage supply, was placed over the centre of the sample, with the point a distance of 28 mm above the lower face of the ITO-coated substrate.

The sample was held at a temperature of 60° C. for 6 minutes, with no voltage applied to the needle. The hotplate temperature was then raised to 150° C. over a period of 4 minutes, whilst the voltage applied to the needle was simultaneously increased up to 15 kV. The hotplate was then held at a temperature of 155° C., with a voltage of 12 kV applied to the needle, for 1 hour before being cooled down to 121° C. over a period of 9 minutes. At 121° C. the sample was quickly removed from the hotplate and the needle voltage switched off. The non-linear optical units of the NLO have now been oriented by the electric field resulting in a film having substantial non-linear optical activity.

A third layer (the top buffer layer) is now coated onto the sample. The composition of the solution used is as follows:

15% polycyclohexylmethacrylate (PCHMA) by weight made up as a solution in toluene.

This solution is spin-coated at a speed of 1500 rpm to form a polymer film 1.5 μm thick. A section of the top buffer approximately 1 cm wide is wiped off at each end of the sample, using a toluene impregnated wipe, to provide space to contact the NLO layer with prisms for device characterisation.

An aluminium electrode 1 cm wide is deposited onto the centre of the remaining top buffer layer by thermal evaporation, in a vacuum chamber, through a mask. Electrical contacts are made to both the aluminium top electrode and the ITO bottom electrode, using copper wire bonded with conducting adhesive.

All the above processing steps were carried out under clean room conditions.

Truncated 45° prisms fabricated from $SrTiO_3$ were clamped onto either end of the sample, in direct contact with the NLO layer. These were used to couple light from an Amoco ALC1320-P diode-pumped ND:YAG laser, operating at 1.32 μm, into and out of the central, NLO, waveguiding layer. The guided light is confined within this central layer, and propagates from input to output prism, passing between the top and bottom electrodes. The active region is defined as the region where the top and bottom electrodes overlap, and is 1 cm in length. Waveguide properties were assessed as described above. At 1320 nm the waveguide supported a single mode, in both TE and TM polarisations. Light of this wavelength was coupled into both modes, and the electro-optic properties of the poled NLO layer assessed. The voltage applied to the electrodes was continuously linearly ramped from 0 to about 100 volts and back to 0 volts again with a time period of about 3.5 msec. The applied voltage and corresponding change in the intensity of the light transmitted through the waveguide, and through a polarising element placed between the output prism and a photo-detector were monitored on a digital storage oscilloscope. The half-wave voltage V was measured directly from the screen of the oscilloscope, as 51.1 volts. The half-wave voltage is related to the effective electro-optic coefficient by the equation $$r_c = (\lambda / n_{TM}^3 \cdot V\pi).(d/l)$$

where λ is the wavelength of the light (1.3 μm), $n_{TM}$ is the refractive index of the NLO composition for TM polarised light within the active region, which has previously been determined as 1.6121, d is the separation of the electrodes (4.5 μm) and l is the length of the active region (i cm). Thus $r_c = 2.7$ pm/V. For this particular geometry $r_c$ is related to the individual r coefficients by the equation $$r_c = r_{33} - (n_{TE}/n_{TM})^3 \cdot r_{13}$$

where $n_{TE}$ is the refractive index of the NLO composition for TE polarised waves within the active region, which has previously been determined as 1.5964. Within the thermodynamic description of the poling process (see for example K D Singer, M G Kuzyk and J E Sohn, in "Nonlinear Optical and Electroactive Polymers", ed P N Prasad and D R Ulrich, Plenum, New York, 1989) it is predicted that $r_{33}$ will be three times $r_{13}$, so that the above relationship becomes $$r_c = 0.676 \cdot r_{33}$$

resulting in a value of 4.0 pm/V for $r_{33}$ for this composition at 1.32 μm.

EXAMPLE 8

Preparation of a Defunctional Dye Waveguide Device

A 1.5 μm thick bottom layer was coated onto an ITO-coated glass substrate and cured as described in Example 7. An NLO layer of the following composition was then coated on top of the buffer layer:
87.5% dimethacrylate dye (Example 2)
5.0% LG156 polymethylmethacrylate copolymer
2.5% di-lauryl peroxide thermal cure initiator
2.5% di-t-butyl peroxide thermal cure initiator
2.5% t-butyl perbenzoate thermal cure initiator
100 ppm FC430 surfactant
100 ppm DC57 surfactant formulated as a solution containing 25% solids by weight in toluene.

The solution was spin coated onto the top buffer layer at a speed of 1200 rpm to produce a film 1.5 μm thick. The sample was placed on top of a 1 mm thick fused quartz slide (which acts as an electrical insulator), which was in turn placed directly onto the hotplate surface directly onto the hotplate. The ITO layer was connected to earth via a 10 MΩ electrical resistor. As in Example 7, the point of the corona needle was placed a distance of 28 mm above the base of the glass slide.

The sample was held at 60° C. for 10 minutes, and then heated up to 155° C. over a period of 9 minutes, whilst the needle voltage was increased from 0 to 11.5 kV. The temperature was held at 155° C. for 51 minutes, with the needle voltage being maintained at 11.5 kV.

The sample was then cooled down to 115° C., whilst the voltage was reduced to 9 kV, over a further period of 7 minutes. The voltage was then switched off and the sample cooled down to room temperature.

A top buffer layer, and aluminium top electrode were prepared as in Example 7, and electrical contact made to the aluminium top electrode and ITO bottom electrode. The waveguide and electro-optic properties of this composition were assessed as in Example 7.

A half-wave voltage $V\Omega$ of 23.4 volts was obtained. This corresponds to an effective electro-optic coefficient of 5.88 pm/V and, under the assumption that $r_{33}=3.r_{13}$ to a value of 8.7 pm/V for $r_{33}$ at 1.32 $\mu$m.

EXAMPLE 9

Preparation of a Defunctional Dye Waveguide Device on a Silicon Substrate

A standard 3 inch diameter silicon wafer was used as the substrate for this device. The wafer had been polished to an optical quality finish on one side, and subsequent coating steps took place onto this polished surface.

The wafer was first cleaned by wiping with a tissue impregnated with lens cleaning fluid, and then a conducting film of chromium-seeded gold was deposited by thermal evaporation in a vacuum chamber. A 20 nm thick film of chromium (Aldrich Chemicals, 99.996% purity) was first deposited, followed by a 40 nm thick film of gold (Johnson Matthey 99.999% purity). This bottom electrode covered the entire surface of the silicon wafer.

A bottom buffer layer having the same compositions as described in Example 7 were then deposited and cured using the same method as in Example 7. An NLO layer having the same composition as described in Example 7 was also deposited, again using the method already described.

The coated wafer was placed on top of a fused silica microscope slide, which was in contact with the surface of the hotplate. The corona needle was positioned with its point 28 mm above the lower surface of the silicon substrate. The gold bottom electrode was connected to earth via a 10 M$\Omega$ resistor. The sample was held at a temperature of 60° C. for 10 minutes, and then heated up to 150° C. over a period of 4 minutes, whilst the voltage was increased from 0 to 12 kV. The sample was maintained at a temperature of 150° C., with a needle voltage of 12 kV for a further 75 minutes, and then cooled down to 135° C. whilst the voltage was reduced to 11.5 kV. The voltage was then switched off and the sample cooled to room temperature.

A partial coating of a top buffer layer of PCHMA, and a top aluminium electrode were deposited as described in the previous examples. The waveguide and electro-optic properties were also assessed as described in these examples. The half-wave voltage for this sample was measured as 26.2 volts. This corresponds to an effective electro-optic coefficient $r_c$ of 5.25 pm/V and and $r_{33}$ coefficient of 7.8 pm/V at 1.32 $\mu$m.

EXAMPLE 10

Effect of Functionality on Resistance to Temperature

Two formulations were prepared as described in Example 4. The first contained a difunctional chromophore with a functional group at each end as prepared in Example 2. The second a tetrafunctional chromophore with two functional groups at each end as prepared in Example 1). All other ingredients were the same. Thin films were spin coated, poled and cured using the same conditions for each formulation as follows:

A 25% wt. % solids solution in toluene was spin coated on to a glass substrate at 1100 rpm for 20 seconds. The film was precured on a hot plate at 60° C., under an atmosphere of nitrogen for 10 minutes. A corona discharge was applied using the conditions described in Example 7 and the temperature of the hotplate increased to 150° C. over a period of 5 mins and held at that temperature for 43 minutes in the case of the difunctional material or 55 minutes in the case of the tetrafunctional material. The sample was then cooled to 60° C. over a period of 1 hour.

Thermal stability of the size of the non-linear optical effect was examined after accelerated aging at elevated temperatures. Two tests were employed to examine samples previously poled and polymerised as described.

The first test was one in which the samples were placed in turn in an apparatus for the purpose of monitoring second harmonic generation to give a measure of the non-linear optical activity. The apparatus comprises a Quantel YG580-10 ND:YAG pulsed laser operating at 1.06 $\mu$m at a pulse repetition rate of 10 Hz, a pulse length of 9 ns and a power less than will cause sample damage. Typically this should be less than 5 nj/pulse at the sample. The SHG is monitored using for example a Philips photomultiplier RFIB2F. The apparatus was constructed to allow the sample to be heated by resting it on a hotplate simultaneously with through-film SHG measurement. The SHG measurements are made in transmission mode so that a small hole was present in the hotplate to allow the probe laser to pass through the glass substrate and then the film under test at an angle of 450°.

The procedure was as follows:

i) The glass substrate supporting the film was placed onto the hotplate at room temperature so that its upper surface was that supporting the film.

ii) The amount of SHG was measured at room temperature relative to a reference sample (to give a value of the absolute amount of activity present in the sample independent of experimental variations such as precise laser power on a day to day basis).

iii) The sample was heated on a hotplate at constant heating rate of 5° C. to a temperature of over 150° C. whilst the intensity of SHG generated was recorded.

FIG. 1 shows relative amounts of SHG obtained as a function of the temperature of the hotplate at the time the SHG values were recorded. Both curves have been normalised to the maximum levels obtained in each case. The tetrafunctional material shows superior stability at temperatures in excess of 80° C. Further curing of the difunctional material (2 hours at 150° C.), and retesting, gave no significant change in this result.

The second test involved periodically examining two samples to determine the effect on them of storing at 60° C. Samples similar to those subjected to the first test were examined for SHG intensity relative to a reference sample. This was performed before the application of any elevated temperature and then again at intermittent intervals during storage in an oven at 60° C. To make these measurements, the samples were removed from the oven for a short period and mounted in an apparatus to measure the SHG.

FIG. 2 shows $[I(2w)/I(2w)_{max}]^{\frac{1}{2}}$ (proportional to the coefficient d) plotted against time at 60° C. It can be seen that for both samples there is an initial drop that is larger in the case of the difunctional material. No further drop is observed over a period of 1500 hours.

EXAMPLE 11

4'-(N-2-Acryloyloxyethyl-N-ethyl) amino-4-(N-2-acryloyloxyethyl-N-methylaminosulphonyl)-2-nitroazobenzene The title compound was prepared in a similar manner to Example 2 using methyl acrylate to give a red solid m.p. 108°–109° C.

$^1$Hnmr (CDCl$_3$; 250 MHz; TMS 1.30 t (3H), 2.95 s (3H), 3.45 t (2H), 3.58q (2H), 3.78 t (2H), 4.30–4.45 m (4H), 5.90 m (2H), 6.03–6.22 m (2H), 6.35–6.40 m (2H), 6.85 d (2H), 7.80–8.02 m (4H), 8.24 dd (1H)

ir (KBr disc) 3107, 1728, 1596, 1517, 1409, 1349, 1146 cm$^{-1}$ m/z 559 (m)+.

Analysis C, 53.2 H,5.1 N,12.3%

$C_{25}H_{29}N_5O_8S$ requires C, 53.66 H,5.22, N,12.51%

An equimolar mixture of the compound and triethylene tetramine was cast into a film from dichloromethane and the solvent allowed to evaporate. The film was heated to 100° C. After 15 minutes >90% of the double bonds had disappeared as measured by Fourier Transform Infra red (FTIR) spectroscopy.

PREPARATION 4

2,5-bis-(2-acetoxyethyloxy)nitrobenzene

Hydroquinone-bis(2-hydroxyethylether (11.0 g; ) 0.057 mol) was stirred in glacial acetic acid (180 ml) and acetic anhydride (17.0 g; 0.166 mol) was added dropwise at room temperature. The mixture was heated to and maintained at reflux temperature for 18 hours, then cooled to below 20° C. and a mixture of 72% nitric acid (4.7 g; 0.054 mol) in glacial acetic acid (20 ml) was added dropwise over 20 minutes maintaining the temperature below 20° C. The reaction mixture was stirred below 20° C. for 16 hours then drowned into water and extracted with ether (2×150 ml). The combined organic extracts were washed with water, saturated sodium bicarbonate solution and brine. After drying and filtration the ether solution was evaporated to leave a brown oil which was dried over potassium hydroxide to give a yellow solid (12.83 g) which was recrystallised from water/ethanol (3:1) to give the title compound as a yellow solid (10.22 g) m.p. 67.5°–70° C.

PREPARATION 5

2.5-bis-(2-acetoxyethyloxy)aniline

A mixture of 2,5-bis(acetoxyethyloxy)nitrobenzene (7.5 g; 0.023 moles), methanol (200 ml) and 1% palladium on charcoal catalyst (1.0 g) was hydrogenated at room temperature and 10 atmospheres pressure for 20 hours. The reaction mixture was filtered and the residue was washed with methanol and water. The filtrate was evaporated to dryness to leave a solid residue which was used without further purification (6.24 g) m.p. 67.5°–69.5° C.

PREPARATION 6

2,5-bis-(2-hydroxyethyloxy)-4-(4-nitrophenylazo)-N,N-bis-(-3-hydroxypropyl)aniline A mixture of 2,5-bis-(2-acetoxyethyloxy)aniline (2.97 g; 0.01 mol), calcium carbonate (1.0 g; 0.01 mol) and water (8.0 ml) were heated to and maintained at reflux for 1 hour. A further quantity of calcium carbonate (1.0 g; 0.01 mol) was added to the acidic mixture and reflux was continued for a further 2 hours. The mixture was filtered whilst hot and sodium carbonate (5.0 g) was added to the cooled filtrate and the mixture was stirred for 1.5 hours then filtered. The filtrate was extracted twice with dichloromethane and the organic phases were discarded.

The aqueous layer was cooled below 10° C. and titrated with diazo 4-nitroaniline until an excess of diazo component was present as indicated by spotting a sample of the reaction mixture onto alkaline H-acid. The reaction mixture was stirred for 2 hours then stood for 48 hours before filtration, washing and drying. The crude product (2.84 g) was purified by flash chromatography (silica/dichloromethane/methanol/gradient. The product was essentially one component (0.49 g) which was recrystallised from aqueous ethanol to give the title compound (0.39 g) m.p. 132°–134° C.

EXAMPLE 12

N,N-bis-(3-acryloyloxypropyl)-2,5-bis(2-acryloyloxyethyloxy)-4-(4-nitrophenylazo)aniline A mixture of the tetraalcohol prepared above (1.0 g; 0.0032 mol), diocyltin oxide (0.6 g; 0.00166 mol) and methylacrylate (20 ml; 0.223 mol) was heated to and maintained at reflux for 7 hours. The mixture was cooled and evaporated to dryness under reduced pressure at ambient temperature and the residue was flash chromatographed (silica/ether/hexane gradient) to give the product as a waxy solid (1.1 g) which was recrystallised from ethanol to give the title compound (0.72 g) m.p 59.62° C.

$C_{34}H_{38}N_4O_{12}$ requires C 58.7; H 5.5; N 8.1%.

Found C 57.9; H5.6; N 7.5%.

$^1$Hnmr (CDCl$_3$) 1.8–2.15 (4H, m) 3.48 (4H, t), 4.2, 4.25–4.35, 4.45–4.7 (12H, t, m, m), 5.75–5.98 (4H, m), 6.05–6.3 (4H, m), 6.35–6.55 (4H, m), 6.6 (H, s), 7.4 (H, s), 7.95 (2H, d), 8.35 (2H, d).

PREPARATION 7

N-ethyl-N-2-methacryloyloxyethylaniline

To a stirred solution of N-ethyl-N-2-hydroxyethylaniline (4.95 g : 0.03 mol) in toluene (50 ml) under air was added methylmethacrylate (19 ml ; 0.178 mol) dioctyltinoxide (1.15 g) and 1% topanol 'O' (0.2 ml solution in CH$_2$Cl$_2$). The mixture was heated at reflux under a steady air flow for twelve hours then the contents cooled and evaporated under reduced pressure to give the crude product (8.97 g>100%). This was purified by flash chromatography (silica/hexane/ethyl acetate gradient) to give the product as a colourless oil (6.89 g; 98%).

$^1$Hnmr (250 MHz; CDCl$_3$; TMS 1.3 t (3H), 2.0 s (3H), 3.5 m (4.4 t (2H), 5.6 s (1H), 6.2 s (1H), 6.7 m (3H), 7.2 m (2H)

ir (liquid film) 2950, 1720, 1600, 1500, 1360, 1300, 1160 cm$^{-1}$

Analysis found C, 72.4; H, 8.3; N, 5.8;

$C_{14}H_{19}NO_2$ requires C, 72.1; H, 8.2; N, 6.0%

EXAMPLE 13

2-carboxy-4'-(N-ethyl-N-2-methacryloyloxyethylamino)-4-nitrobenzene

To a stirred mixture of 2-amino-5-nitrobenzoic acid (3.64 g; 0.02 mol) in water (100 mls) containing 47% sodium hydroxide solution (2 ml), concentrated hydrochloric acid (12 ml) was added. The resulting mixture was stirred below 5° C. and 2N sodium nitrate solution (10 mls; 0.02 mol) was added. After stirring for 2.5 hours below 5° C., the excess nitrous acid was destroyed by adding 10% sulphamic acid solution to give an orange diazonium mixture.

The above mixture was added rapidly to a solution of N-ethyl-N-2-methacryloylethylaniline (4.67 g; 0.02 mol) in acetone (100 mls) keeping the temperature below 5° C. The mixture was neutralised with sodium acetate and diluted with water to give a total volume of 600 ml. After stirring for 16 hours the pH was adjusted to 2.0 by the addition of concentrated hydrochloric acid. The mixture was then filtered and washed with water to give after drying, a black solid. (7.27 g; 85%). m.p. 149°–151° C.

$C_{21}H_{22}N_4O_6$ requires C 59.15; H 5.2; N 13.1%. Found C 58.1; H 5.0; N 12.9%.

$I_H$ nmr ($d^6$DMSO) 1.2 (3H, t), 1.85 (3H, s), 3.60 (2H, s), 3.80 (2H, m), 4.30 (2H, m), 5.65 (H, m), 6.0 (H, m), 6.95–7.05 (3H, m), 8.37–845 (H, m), 8.5 (H, m);

ir (KBr) 3368; 1722; 1605; 1515; 1375; 903 cm-1

EXAMPLE 14

4'-(N-ethyl-N-2-methacryloyloxyethylamino)-2-(-2-methacryloyloxyethoxycarbonyl-4-nitroazobenzene To a stirred solution of 2-carboxy-4(N-ethyl-N-methacryloyloxycarbonyl)amino-4-nitrobenzene (5.0 g; 0.012 mol) and 2-hydroxyethylmethacrylate (1.47 g; 0.012 mol) in dry dichloromethane (100 ml), dicyclolhexylcarbodiimide (2.67 g; 0.013 mol) and dimethylaminopyridine (0.01 g) were added. After stirring for 2.5 hours the mixture was allowed to stand before it was filtered. The resulting filtrate was evaporated to dryness under reduced pressure to give a viscous red oil. (7.50 g).

The crude product was purified by flash chromatography (silica/hexane/ethyl acetate gradient), then recrystallised from ethanol to give, after drying, a lustrous, green, crystalline olid (3.09 g; 48%) m.p. 94°–95° C.

PREPARATION 8

N,N-Bis-2-acryloyloxyethylaniline

The title compound was prepared in a similar manner to Preparation 7 to give a pale amber oil.

¹Hnmr (CDCl₃; 250 MHz; TMS) 1.97 s (6H), 3.73 t (4H), 4.30 t (4H), 5.58 m (2H), 6.62 m (2H), 6.70–6.85 m (3H), 7.20–7.28 m (2H)

ir (thin film) 2950, 1720, 1600, 1500, 1300, 1160, 745 cm⁻¹

Analysis found C, 68.3; H7.8; N,4.3;
$C_{18}H_{23}NO_4$ requires C, 68.12; H7.30; N,4.41%

PREPARATION 9

2-Carboxy-4'-[N,N-bis-(2-methylacryloyloxyethylamino]-4-nitroazobenzene

The title compound was prepared in a similar manner to Example 13 to give a dark red solid m.p. 142° C.

PREPARATION 10

N-2-Acryloyloxyethyl-N-ethylaniline

The title compound was prepared in a similar manner to Preparation 7 to give a yellow oil, ¹Hnmr (250 MHz; CDCl₃; TMS) 1.20 t (3H), 3.40–3.61 m (4H), 4.40 t (2H), 5.80 d (1H), 6.10q (1H), 6.40 d (1H), 6.70 m (3H) , 7.20 m (2H) , ir (thin film) 2920, 1730, 1600, 1500, 1410, 1270, 1190 cm⁻¹ m/z 219 (m)⁺.

PREPARATION 11

2-carboxy-4'-(N-2-acryloyloxyethyl-N-ethylamino)-4-nitroazobenzene

To a stirred solution of N-2-acryloyloxyethyl-N-ethylaniline (10.90 g, 0.05 mol) in acetone (200 ml) was added 2-carboxy-4-nitrobenzene diazonium mixture (0.05 mol) maintaining the temperature at <5° C. The mixture was then neutralised by the addition of sodium acetate, diluted to 800 ml volume with water and stirred over the weekend. The resulting mixture was filtered and washed with water and then dried (40° C. vac oven) to give a purple solid (18.16 g; 88%) m.p. 138°–143° C.

EXAMPLE 15

2-(2-Acryloyloxyethoxycarbonyl)-4'-(N-acryloyloxyethyl-N-ethylamino)-4-nitroazobenzene The title compound was prepared in a similar manner to Example 14 to give a solid m.p. 121°–123° C.

PREPARATION 12

4-(3-Carboxy-5-nitrothien-2-ylazo)-N-ethyl-N-2-methacryloyloxyethylaniline

To a mixture of 64% 2-formylamino-3-carboxy-5-nitrothiophene (4.71 g; 0.0139 mol) in water (20 ml), 0.88 ammonia (8 ml) was added at 30° C. After stirring for 1½ hrs the mixture was diluted with water (100 ml), cooled to 5° C. and the pH adjusted to 5pH 2 by the addition of concentrated hydrochloric acid. To the resulting mixture glacial acetic acid (50 ml) and concentrated hydrochloric acid (5 ml) were added. The mixture was stirred at −5° C. and 2N sodium nitrite solution (7 ml; 0.014 mol) added dropwise over ½ hr at 20° C. After stirring for 2hr at <0° C. the excess nitrous acid was destroyed by the addition of 10% sulphamic acid solution and then filtered. The resulting filtrates (diazonium solution) were then rapidly added to N-ethyl-N-2-methacryloyloxyethylaniline (3.25 g; 0.0139 mol) at <0° C. After stirring overnight the reaction mixture was filtered, washed with water to give after drying (60° C. vac oven) a greenish blue solid (1.25 g; 21%).

¹Hnmr (CDCl₃; 250 mHZ; TMS) 1.35 t (3H), 1.95 s (3H), 3.69q (2H), 3.85 t (2H), 4.50 t (2H), 5.62 m (1H), 6.10 m (1H), 6.90 d (2H), 7.82 d (2H), 8.30 s (1H).

m/z 432 (m)⁺.

Analysis found C, 52.0; H 4.5; N, 12.7;
$C_{19}H_{20}N_4O_6S$ requires C, 52.77; H, 4.66; N, 12.96

EXAMPLE 16

N-Ethyl-N-2-methacryloyloxyethyl-4-(3-methacryloyloxyethoxycarbonyl-5-nitrothien-2-ylazo) aniline The title compound was prepared in a similar manner to Example 14 to give a dark green crystalline solid ¹Hnmr (CDCl₃; 250 MHz; TMS) 1.32 t (3H), 2.00 s (6H), 3.62q (2H), 3.75 t (2H), 4.40 t (2H), 4.57 m (2H), 4.67 m (2H), 5.62 m (2H), 6.15 m (2H), 6.82 d (2H), 7.90 d (2H), 8.28 s (1H)

ir (KBr disc) 1720, 1602, 1300, 1130, 830 cm⁻¹.

m/z (FAB) 544 (m+H)⁺.

The film was heated to 100° C. After 60 minutes >95% of the double bonds had disappeared as measured by FTIR.

EXAMPLE 17

2-(2-Methacryloyloxyethoxycarbonyl)-4'-[N,N-bis-(2-methacryloyloxyethyl)amino]-4-nitroazobenzene The title compound was prepared in a similar manner to Example 14 to give a lustrous green crystalline solid m.p. 73°–76° C.

$^1$Hnmr (CDCl$_3$; 250 MHz; TMS) 1.92 s (3H), 1.96 s (6H), 3.85 t (4H), 4.32–4.43 m (6H), 4.65 m (2H), 5.60 m (3H), 6.10 m (3H), 7.00 d (2H), 7.75 d (1H), 7.88 d (2H), 8.4odd (1H), 8.68 d (1H)

ir (KBr disc) 2960, 1730, 1705, 1600, 1518, 1342, 1158 cm$^{-1}$

M/z 622 (m)+.

Analysis found C, 59.8; H, 5.6; N, 8.7;
C$_{31}$H$_{34}$N$_4$O$_{10}$ requires C, 59.80; H, 5.50, N, 9.00%

EXAMPLE 18

2-(2,3-Epoxypropoxycarbonyl)-4'-(N-ethyl-N-2-methacryloyloxyethylamino)-2-nitroazobenzene The title compound was prepared in a similar manner to Example 14 to give a solid m.p. 103°–105° C.

$^1$Hnmr (CDCl$_3$; 250 MHz; TMS) 1.30 t (3H), 2.00 s (3H), 2.70 m (1H), 2.90 m (1H), 3.30 m (1H), 3.50–3.70 m (4H), 4.30 m (3H), 4.60 d (1H), 5.60 s (1H), 6.10 s (1H), 6.80 d (1H), 7.80 d (1H), 7.90 d (1H), 8.40 dd (1H), 8.70 s (1H).

ir (KBr disc) 1730, 1705, 1600, 1520, 1390, 1340, 1250, 1150 cm$^{-1}$ m/z (FAB) 483 (m+H)+

Analysis found C, 60.9; H, 5.5; N, 11.6;
C$_{24}$H$_{26}$N$_4$O$_7$ requires C, 59.8; H, 5.4; N, 11.6%

PREPARATION 13

2-Carboxy-4'-N-(2,3-epoxypropyl-N-ethylamino)-4-nitroazobenzene

To a stirred solution of N-2,3-epoxypropyl-N-ethylaniline (3.52 g, 0.02 mol) in acetone (50 ml) was added 2-carboxy-4-nitrobenzene diazonium mixture (0.02 mol) maintaining the temperature <5° C.). The mixture was then neutralised with sodium acetate and then stirred for 18 hrs at room temperature. The resulting mixture was filtered and washed with water (400 ml) then dried (50° C. vac oven) to give a red solid (6.61 g, 89.3% m.p. 128°–133° C.

EXAMPLE 19

4'-(N-(2,3-epxoypropyl)-N-ethylaminol-2-(2,3-epoxypropoxycarbonyl)-2-nitroazobenzene The title compound was prepared in a similar manner to Example 14 to give a solid.

$^1$Hnmr (CDCl$_3$; 250 MHz; TMS) 1.30 t (3H), 2.60 m (1H), 2.19 m (1H), 2.95 m (2H), 3.20–3.40 m (2H), 3.50–4.00 m (4H), 4.30q (1H), 4.70 m (1H), 6.80 d (2H), 7.80 d (1H), 7.90 d (2H), 8.40 m (1H), 8.65 d (1H)

m/z (FAB) 427 (m+H)+.

Analysis found C, 59.3; H 5.3; N, 12.9;
C$_{21}$H$_{22}$N$_4$O$_6$ requires C, 59.1; H, 5.9; N, 13.1%

An equimolar mixture of the compound and triethylene tetramine was cast into a film from dichloromethane and the solvent allowed to evaporate. The film was heated to 100° C. After 15 minutes 85% of the epoxy groups had disappeared, after 60 minutes 90% had disappeared as measured by FTIR.

EXAMPLE 20

4'-(N-2-Acryloyloxyethyl-N-ethylamino)-2-(2-tert-butoxycarbonylaminoethoxycarbonyl)-4-nitroazobenzene The title compound was prepared in a similar manner to Example 14 to give an orange solid m.p. 121°–123° C.

$^1$Hnmr (CDCl$_3$; 250 MHz; TMS) 1.28 t (3H), 1.53 s (9H), 3.42–3.62 m (4H), 3.75 t (2H), 4.40q (2H), 4.80 m (1H), 5.85–6.48 m (3H), 6.83 d (2H), 7.72–7.92 m (3H), 8.48 dd (1H), 8.65 d (1H)

ir (KBr disc) 3355, 2930, 1720, 1684, 1600, 1340, 1252, 824 cm$^{-1}$.

m/z (FAB) 555 (m+H)+.

Analysis found C, 58.4, H 6.1; N, 12.5;
C$_{27}$H$_{33}$N$_5$O$_8$ requires C, 58.37; H, 5.99; N,12.61%

PREPARATION 14

2-Carboxy-4'-(N-3-tert-butoxycarbonylaminopropyl-N-methylamino)-4-nitroazobenzene The title compound was prepared in a similar manner to Example 13 to give a red solid m.p. 183°–186° C.

EXAMPLE 21

2-(2-tert-butoxycarbonylaminoethyoxycarbonyl)-4'-(N-3-tert-butoxycarbonylaminopropyl-N-methylaminol-4-nitroazobenzene The title compound was prepared in a similar manner to Example 14 to give a red solid m.p. 78.5°–83° C.

$^1$Hnmr (CDCl$_3$; 250 MHz; TMS) 1.50 s (3H), 1.52 s (3H), 1.90 m (2H), 3.10 s (3H), 3.18–3.38 m (4H), 3.38–3.60 m (4H), 4.40 t (2H), 6.75 d (2H), 7.70–7.92 m (3H), 8.37 dd (1H), 8.62 d (1H)

ir KBr disc) 3365, 2975, 1686, 1601, 1518, 1329, 1142, 819 cm$^{-1}$

The protected amine functionalised dye produced was deprotected to give the amine by stirring the dye in dichloromethane containing trifluoracetic acid.

EXAMPLE 22

4'-(N-ethyl-N-2-methacryloyloxyethylamino)-2-(2-hydroxyethoxycarbonyl)-4-nitroazobenzene To a stirred solution of 2-carboxy-4'-(N-ethyl-N-2-methacryloyloxyethylamino)-4-nitroazobenzene (2.13 g, 0.005 mol) in DMF (30 ml) was added 2-bromoethanol (0.40 ml, 0.0055 mol), and potassium carbonate (0.76 g, 0.0055 ml). The resulting mixture was heated at 90° C. for three hours then cooled and drowned into water (60 ml). The mixture was extracted into dichloromethane (2×200 ml) then washed with water (3×400 ml) and saturated brine (400 ml). The resulting organic extract was dried (MgSO$_4$) and evaporated to dryness under reduced pressure to give a red solid (crude product 0.54 g, 23%). The crude product was purified by flash chromatography (silica/hexane/ethyl acetate gradient) followed by recrystallisation from toluene:hexane (1:1) to give after drying (40° C. vac oven) a red solid (0.37 g, 16%) m.p. 84°–86° C.

$^1$Hnmr (250 MHz; CDCl$_3$; TMS) 1.3 t (3H), 1.755 (3H), 2.9 m (2H), 3.7q (2H), 3.8 t (2H), 3.9 m (2H), 4.4 m (4H), 5.65 (1H), 6.25 (1H), 6.8 d (2H), 7.9 d+d (2H), 8.4 d (1H), 8.73 (1H)

ir (KBr disc) 3500, 1720, 1600, 1520f 1390, 1340, 1150 cm m/z 470 (M)+.

Analysis found C, 58.9; H, 5.4; N, 11.6;
C$_{23}$H$_{26}$N$_4$O$_7$ requires C, 58.7; H, 5.5; N, 11.9

PREPARATION 15

N-(diethyl)-2,5-dimethoxyaniline

To a solution of 2,5-dimethoxyaniline (25.0 g; 0.16 mol) in absolute ethanol (300 ml) were added iodoethane (76.4 g; 0.48 mol) and triethylamine (49.5 g, 0.49 mol). After stirring at reflux for 36 hours a further portion of iodoethane (76.4 g; 0.48 mol) was added to the reaction solution and reflux continued for 48 hours. The reaction mixture was then cooled to room temperature, diluted with water (400 ml), and extracted into cihloromethane (2×300 ml). The organic extracts were washed with water (2×400 ml), dried with magnesium sulphate, and solvent was then removed under reduced pressure to give a brown oil. The crude product was purified by flash chromatography, eluting first with hexane and subsequently increasing the polarity with dichloromethane. This procedure afforded the product as a colourless, viscous oil (17.3 g; 52%).

ir (film): 2970, 2832, 1606, 1589, 1506 1214, 1051, 736

PREPARATION 16

N-(diethyl)-2,5-dihydroxyaniline hydrobromide

To N-(diethyl)-2,5-dimethoxyaniline (4.3 g; 0.02 mol) (Preparation 15) under nitrogen was added 50 ml of 48% aqueous hydrogen bromide. This mixture was then refluxed for 5 hrs before volatiles were removed in vacuo. The resulting dark brown solid was recrystallised from ethanol-diethyl ether mixture to give the product as a white powder (3.8 g; 72%). The free amine is unstable in air at room temperature but a small sample was prepared by shaking the product with sodium bicarbonate under nitrogen for characterisation purposes.

ir ($CH_2Cl_2$); 3685, 3597, 3056, 2974, 2933,
(of free amine) 2856, 1605, 1504

PREPARATION 17

Preparation of the polymer from N,N'-(diethyl)-2,5-dihydroxyaniline hydrobromide and epichlorohydrin A round bottom flask was evacuated and back filled with nitrogen five times before being charged with N,N-(diethyl)-2,5-dihydroxyaniline hydrobromide (3.2 g; 0.01 mol) (Preparation 16) epichlorohydrin (1.1 g; 0.01 mol) and benzyltriethylammonium chloride (0.3 g). In a separate flask cyclohexanone (10 ml) and water (7 ml) were thoroughly degassed by multiple freeze-thaw cycles before being added to the reaction mixture. Finally 50% aqueous sodium hydroxide (1.1 g; 0.02 mol), which had also been degassed, was added to the reaction flask. The reaction mixture was then vigorously stirred at 80° C. for 4 hours after which the aqueous layer was removed and the organic phase washed with water (3×25 ml). Precipitation of the polymer solution into water afforded the polymer as an off white solid (1.7 g; 72%).

ir (film) : 3424, 2925, 2854, 1624, 1509, 1455, 1205, 1042.

The polymer from Preparation 17 was reacted with the diazonium salt of 5 nitro-anthrilic acid as described for Example 13, except that the polymer was dissolved in DMF, and the product purified by precipitation to afford a dark red solid.

ir (film) : 3416, 2784, 1648, 1468, 1020.

The polymer from the previous preparation was then acrylated as described for Example 11, precipitation of the polymer solution affording a dark red solid.

ir (film) : 3446, 2994, 2953, 1731, 1674, 1451, 1388, 1273, 1244, 1194, 1149.

EXAMPLE 23

The polymer from the previous preparation was reacted as described for Example 14. Precipitation of the polymer solution afforded a dark red solid.

ir (film) ; 2995, 1731, 1651, 1390.

PREPARATION 18

Preparation of N-(3-cyanopropyl)-N-methyl-2,5-dimethoxyaniline

To a stirred solution of N-(3-cyanopropyl)-2,5-dimethoxyaniline (46.2 g; 0.22 mol) in absolute ethanol (400 ml) were added iodomethane (47.7 g; 0.34 mol) and triethylamine (34.0 g; 0.34 mol). After stirring at 50° C. for 24 hours a further portion of iodomethane (47.7 g; 0.34 mol) was added to the reaction mixture, which was then heated at 50° C. for a further 24 hours. The reaction mixture was then cooled, diluted with water (500 ml) and extracted with dichloromethane (3×200 ml) and washed with water (2×400 ml). The resulting organic extract was dried ($MgSO_4$), the solvent was then removed under reduced pressure to give a brown oil. The crude product was purified by flash chromatography, eluting first with hexane and subsequently increasing the polarity with dichloromethane. This procedure afforded the product as a colourless oil (26.8 g; 54%).

ir (film) : 2942, 2865, 2155, 1605, 1510.

PREPARATION 19

Preparation of N-3-(aminopropyl)-N-methyl-2,5-dimethoxyaniline

To a stirred suspension of lithium aluminium hydride (4.6 g; 0.12 mol) in dry tetrahydrofurom (380 ml) at 0° C. was added dropwise N-(2-Cyanopropyl)-N-methyl-2,5,-dimethoxyaniline (26.8 g; 0.12 mol) (Preparation 18) in dry tetrahydrofurom (100 ml). The mixture was stirred for 30 mins before water (5 ml) was carefully added to the flask. The reaction mixture was then filtered and the filtrate dried ($MgSO_4$) and solvent removed in vacuo to give a brown oil. The crude material was purified by flash chromatography, eluting with dichloromethane afforded the product as a yellow oil (13.4 g; 49%).

ir (film): 3424, 2937, 2861, 1610, 1514.

PREPARATION 20

Preparation of N-3-(aminopropylhydrobromide)-N-methyl-2,5-dihydroxyaniline

The product was produced using the same procedure as in Preparation 16. The product was obtained as a white crystalline solid. The free amine is unstable at room temperature in air, but a small sample of the product was shaken with sodium bicarbonate under nitrogen, the liberated amine extracted and its ir spectrum measured for characterisation purposes.

ir ($CH_2Cl_2$) 3684, 3597, 3405, 2907, 1607, 1518, 1425, 1176.

PREPARATION 21

Preparation of the Polymer from N-3-(aminopropyl)-N-methyl-2,5-dihydroxyaniline and 1,3-dibromopropane The product was obtained as described in Preparation 17 using 1,3-dibromopropane and obtained as an off white solid.

ir (film) : 3331, 2934, 2860, 1611, 1503, 1448, 1209, 1063, 818.

This polymer was reacted with the diazonium salt of 5-nitro-anthrilic acid as described in Example 13 using DMF as polymer solvent. Precipitation afforded the product as a red powder.

ir (film): 3420, 3122, 2932, 1611, 1586, 1530, 1484, 1330, 1255, 1137

EXAMPLE 24

Reaction of the polymer from the previous preparation N-3-tert-butoxycarbonyl)-aminoethanol and subsequent deprotection with trifluoroacetic acid.

This procedure was carried out as described for Example 21. Precipitation of the polymer solution afforded a dark red solid.

EXAMPLE 25

Freshly distilled acrylic acid (0.0639 g, 0.887 mmol) was copolymerised with the compound of Example 13 (0.3781 g, 0.887 mmol). The polymerisation was initiated using 1 mol% α-azo-isobutyronitrile (BDH, 97% (0.0029 g, 0.0177 mmol) and 1 mol % tertiary butyl peroxy 2-ethyl hexanoate (0.0044 g, 0.0177 mmol). These materials were dissolved in dimethyl formamide (Aldrich, anhydrous, >99%, packed under nitrogen) at a concentration of 10 wt. % (4.0437 g dimethyl formamide). The solution, made up in a 100 ml 2-necked flask, was degassed under an argon purge by clamping in an ultrasonic bath for 2 hours. The flask was then transferred to an oil bath at 75° C., and the polymerisation was allowed to proceed under a positive pressure of argon for 18 hours. Stirring was by magnetic stirrer.

A further 2 mol % α-azo-iso-butyronitrile (0.0056 g), 0.0354 mmol) was added, and the degassing and polymerisation procedure repeated as described above.

The product was purified by precipitation from dimethyl formamide three times in a 50:50 mixture, by weight, of petroleum ether (40°-60° C.) and methanol (Fisons HPLC solvent, 99.8%) followed by centrifugation.

The polymer was then dissolved in a minimum volume of DMF and stirred with a slight excess of 2-methylaziridine and one microspot of p-toluenesulphonic acid for 72 hr at 50° C. Precipitation of the polymer solution into methanol/petroleum ether afforded the product as a dark red powder.

The molecular weight of the polymer was analysed using NAMAS accredited GPC chromatography. A sample was dissolved in THF (3 mg/ml) and passed through Polymer Laboratories PLGEL columns, calibrated using Polystyrene standards, at 0.5 ml/min at 24° C. The molecular weight distribution was obtained using a refractometer detection system. The weight average and number average molecular weights were 48,100 and 25,000 respectively.

EXAMPLE 26

Freshly distilled glycidyl methacrylate (0.0884 g, 0.6224 mmol) was copolymerised with an equimolar quantity of the compound from Example 18 (0.30 g, 0.6224 mmol).

The polymerisation was initiated using 0.4 mol % (0.0008 g) α-azo-iso-butyronitrile (AZDN) (BDH, 97%). All glassware was dried in an oven at 140° C. and cooled in a desiccator. The monomers and initiator were dissolved in dimethyl formamide (Aldrich, anhydrous, >99%, packed under nitrogen), and the solution transferred to a 3½ inch Carius tube. Further dimethyl formamide was then added until a total of 3.495 g had been used, giving a solution concentration of 10 wt. %. The contents of the Carius tube were degassed by conventional freeze-thaw procedure, repeated three times. The tube was then sealed under a vacuum of 0.01 mbar, and placed in a rocking autoclave at 60° C. for 72 hours. A further 0.4 mol % α-azo-iso-butyronitrile (0.008 g) was then added, and the above procedure repeated to improve the yield. On this second occasion polymerisation was allowed to proceed for 48 hours.

The polymer was purified by reprecipitation from dimethylformamide into methanol (Fisons HPLC solvent, 99.8%). Finally, the polymer was dried in a vac oven overnight.

Differential scanning calorimetry (Mettler DSC30) revealed a Tg of 96° C. Gel permeation chromatography, using a polystyrene standard, showed an Mn=48,500.

We claim:

1. An optical element having non-linear optical properties comprising a multi-functional, chromophore containing, polymerizable compound wherein the multi-functional chromophore is a compound capable of being polymerized into a cross-linked network and of being poled under the influence of an electric field while being polymerized into the cross-linked network, the compound having the generalized formula (D) (C) (A) (F)

D, C, A, and F representing covalently linked moieties where C represents at least one conjugated system of π-electron donor groups linked at opposite ends of the conjugated system C; F represents at least two polymerizable functional groups, which may be the same or different, attached to the π-conjugated system C, group A or group D via substituent groups $R^1$ and $R^2$; and $R^1$ and $R^2$ are independently selected from such groups as alkyl, cycloalkyl, aryl heteroalkyl, alkenyl, cycloalkenyl, and alkynyl groups, substituted variants of such groups and heteroatom-containing variants of such groups wherein at least one carbon atom has been replaced by a heteroatom, the groups F being linked to the compound so that after the compound has been polymerized to give a cross-linked network the interpolymerized functional groups prevent significant realignment of the chromophore groups when the optical element is subject to temperature changes such that after annealing the optical element at 60° C. for 1 hour the normalized second harmonic generation intensity (SHG) fall by less than 10% if the optical element is held at 60° C. for 1000 hours.

2. An optical element as claimed in claim 1 wherein conjugated system C is selected from at least one of an aromatic ring system, a (poly)ene system containing at least one conjugated π-bond, a (poly)yne system containing at least one conjugated acetylene bonds, a quinomethide system or heteroatom-containing variants of such systems wherein one or more carbon atoms and/or one or more C═C double bonds are replaced by a heteroatom.

3. An optical element as claimed in claim 1 wherein the π-electron donor group D is appended to the conjugated system C and is selected for the groups amino, $NR^1R^2$; thio, $SR^1$; oxy, $OR^1$; phosphino, $PR^1R^2$,, where $R^1$ and $R^2$ are independently selected from such groups as alkyl, cycloalkyl, aryl heteroalkyl, alkenyl, cycloalkenyl, and alkynyl groups, substituted variants of such groups and heteroatom-containing variants of such groups wherein at least one carbon atom has been replace by a heteroatom.

4. An optical element as claimed in claim 1 wherein the $\pi$-electron acceptor group A is selected from the groups nitro, $NO_2$; cyano, CN; nitroso, NO; ester, $CO_2R^1$; amide, $CONR^1R^2$, ketone $COR^1$; formyl, COH; sulphone, $SO_2R^1$; sulphoxide, $SOR^1$; sulphonate ester, $SO_3R^1$; sulphonamide, $SO_2NR^1N^2$; phosphonate, $P(=O)OR^1OR^2$; phosphine oxide, $P(=O)R^1R^2$; boronate ester, $B(OR^1)OR^2$; N-pyridium where $R^1$ and $R^2$ are independently selected from such groups as alkyl, cycloalkyl, aryl heteroalkyl, alkenyl, cycloalkenyl, and alkynyl groups, substituted variants of such groups and heteroatom-containing variants of such groups wherein at least one carbon atom has been replaced by a heteroatom.

5. An optical element as claimed in claim 1 wherein each of the at least two polymerizable groups represented by F are independently selected form acrylate ester, methacrylate ester, acrylamide, methacrylamide, epoxide, isocyanate, cyanate, hydroxy, amino or maleimide groups.

6. An optical element as claimed in claim 1 wherein each of the at least two polymerizable groups represented by F are selected such that during the polymerization step (c) the cross-linking of the polymeric structure by the polymerizable groups is achieved by a non-elimination reaction.

7. An optical element as claimed in claim 1 wherein the group F comprises a first polymerizable group $F^1$ and a second polymerizable group $F^2$ which are different from and polymerizable with one another but which are substantially not polymerizable with others of the same group.

8. An optical element as claimed in claim 1 comprising a cured and poled film.

9. An optical element having non-linear optical properties comprising a multi-functional, chromophore containing, polymerizable compound wherein the multi-functional chromophore is a compound capable of being polymerized into a cross-linked network and of being poled under the influence of an electric field while being polymerized into the cross-linked network, the compound having the generalized formula (D) (C) (A) (F)

D, C, A, and F representing covalently linked moieties where C represents at east one conjugated system of $\pi$-electron donor groups linked at opposite ends of the conjugated system C; F represents at least two polymerizable functional groups, which may be the same or different, attached to the $\pi$-conjugated system C, group A or group D via substituent groups $R^1$ and $R^2$; and $R^1$ and $R^2$ are independently selected form such groups as alkyl, cycloalkyl, aryl heteroalkyl, alkenyl, cycloalkenyl, and alkynyl groups, substituted variants of such groups and heteroatom-containing variants of such groups wherein at least one carbon atom has been replaced by a heteroatom, the groups F being linked to the compound so that after the compound has been polymerized to give a cross-linked network the interpolymerized functional groups prevent significant realignment of the chromophore groups when the optical element is subject to temperature changes such that the optical element exhibits and or of less than 50% in the normalized second harmonic generation intensity (SHG) after heating at a rate of 5° C. per minute from ambient to 150° C.

10. An optical element according to claim 9 comprising a cured and poled film.

* * * * *